Nov. 11, 1958   H. B. SEDGFIELD   2,859,623
GYROSCOPIC APPARATUS

Filed Aug. 16, 1956   2 Sheets-Sheet 1

INVENTOR
HUGH BROUGHAM SEDGFIELD
BY
ATTORNEY

Nov. 11, 1958  H. B. SEDGFIELD  2,859,623
GYROSCOPIC APPARATUS
Filed Aug. 16, 1956  2 Sheets-Sheet 2
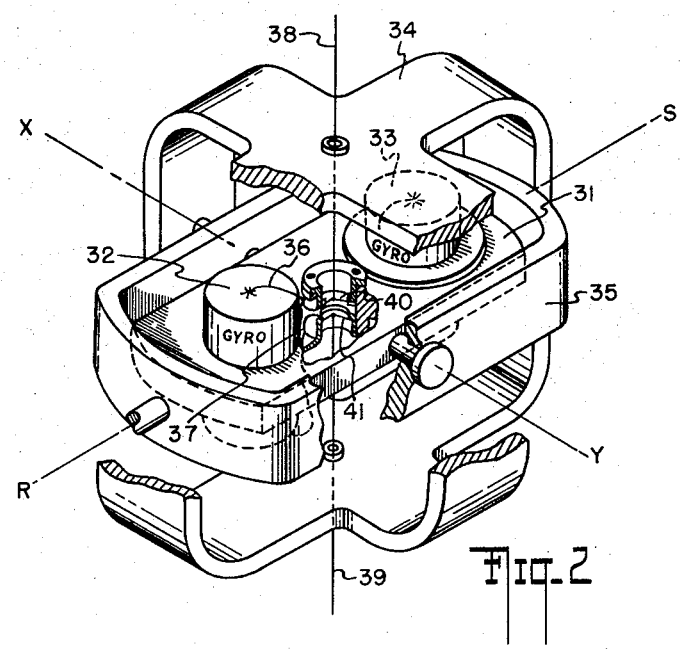
Fig. 2
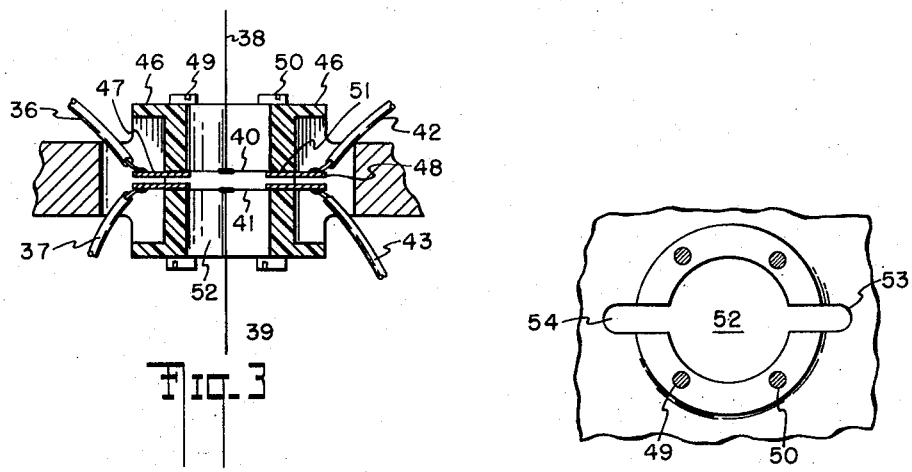
Fig. 3
Fig. 5
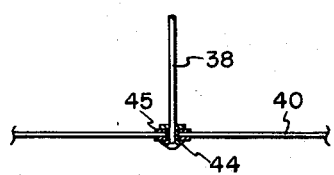
Fig. 4
INVENTOR
HUGH BROUGHAM SEDGFIELD
BY
Herbert H. Hagmann
ATTORNEY United States Patent Office 2,859,623
Patented Nov. 11, 1958

2,859,623
GYROSCOPIC APPARATUS

Hugh Brougham Sedgfield, Oakfield, Hampton, England, assignor to The Sperry Gyroscope Company Limited, Brentford, England, a British company Application August 16, 1956, Serial No. 604,519

Claims priority, application Great Britain August 25, 1955

7 Claims. (Cl. 74—5)

This invention relates to electrically operated gyroscopes.

One of the problems that arises in electrically operated gyroscopes is that it is necessary to take one or more electrical connections to a sensitive element. The usual method of doing this is to use slip rings, but these introduce friction. An alternative method frequently used when the sensitive element is supported with limited freedom of angular movement in a follow-up member is to employ flexible wire or ligament connections inter-connecting the sensitive element and the follow-up support, and to use these flexible connections as the current-carrying conductors. However, the flexible connections always exercise some torque between the sensitive element and the follow-up member, which torque operates to disturb the sensitive element. An important problem, therefore, is how to design these flexible connections so that they exercise the minimum disturbing torque on the sensitive element.

One method that has been proposed where the sensitive element is mounted about a pivot axis in a follow-up element is to use, as the flexible connection, a thin straight wire running in a direction normal to the pivot axis and connected to the sensitive element at a point on the pivot axis, or near to the pivot axis. An extension of this method has been disclosed in the copending application of Sedgfield, Taylor and MacDougall, Serial No. 696,077 filed November 13, 1957 entitled Gyroscopic Apparatus which is a continuation of Serial No. 147,444 filed March 3, 1950 and now abandoned. In the gyroscope of that application the sensitive element is mounted with angular freedom relative to the follow-up support about two mutually perpendicular pivot axes intersecting at a pivot centre, and the invention of the application consisted in the use of flexible electrical conductors directly inter-connecting the follow-up member and the sensitive element, these conductors being in the form of straight wires running in a direction normal to both pivot axes and connected to the sensitive element at or near the pivot centre. In the gyroscope illustrated in the specification of that application the pivot centre was at the centre of a hollow tube serving as a fixed shaft about which the rotor turned, and the electrical connections passed axially down this hollow tube.

In the previous proposals of the kind discussed, the flexible conducting wire or ligament, at its point of attachment to the sensitive element, has been clamped to a fixed part of the sensitive element. On the occurrence of any relative inclination between the sensitive element and the follow-up member a slight bend then necessarily occurred in the conductor. Owing to the stiffness of the conductor this bend entailed the application of a small torque between the sensitive element and the follow-up member. No matter how compliant the conductors were made this disturbing torque was undesirably large for accurate gyroscopes.

An object of the present invention is to provide gyroscopic apparatus of the kind referred to in which an improved method of attachment of the conducting ligament to the sensitive element is provided.

According to the present invention there is provided gyroscopic apparatus of the kind comprising a sensitive element, such as the vertical ring of a gyro compass, mounted in a follow-up member with limited freedom of angular movement about an axis relative to the follow-up member and in which electrical connection is made between the sensitive element and the follow-up member by means of one or more primary flexible conducting wires or ligaments each of which extends from a point or points where it is attached to the follow-up member to a point where it is attached to the sensitive element in the vicinity of the pivot axis, wherein the primary conducting ligament is attached to the sensitive element by means of flexible support means to which the primary ligament is attached and which serves to locate the point of attachment of the ligament and the support means in such a manner that the direction of the primary ligament passes through the axis but which, by its yielding, readily permits angular displacement of the primary ligament and the flexible support means in the vicinity of the point of attachment about the axis relative to the sensitive element.

Embodiments of the invention will now be described with reference to the accompanying drawings in which:

Fig. 2 is a schematic illustration of gyroscopic apparatus embodying another form of the invention;

Fig. 3 is an enlarged section through a portion of Fig. 2;

Fig. 4 illustrates a method of attachment of a ligament to a diaphragm;

Fig. 5 is a section through the bore in the sensitive element of Fig. 2.

Figure 1:
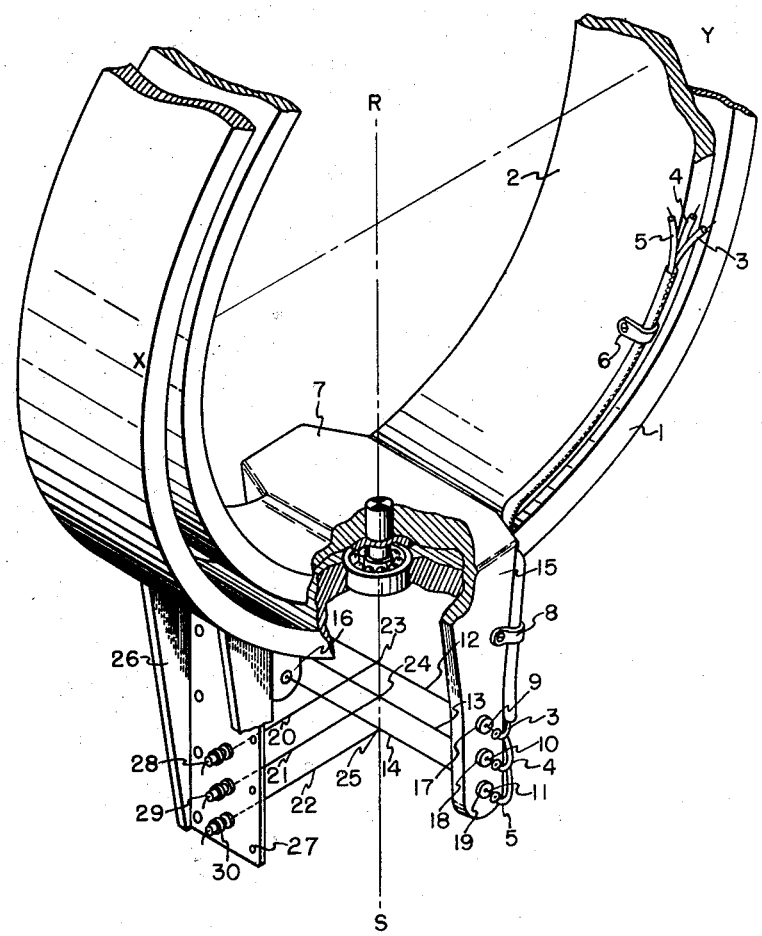
Fig. 1 is a schematic illustration of the vertical ring and the follow-up member of a gyro compass embodying one form of the invention.

Referring to Fig. 1 the invention is applied for taking current between the follow-up member 1 and the vertical ring 2 of a gyro compass, the vertical ring 2 constituting the sensitive element. Details of the gyro compass are not shown since they are irrelevant to an understanding of the invention, but such details may be obtained by reference to the Patent No. 2,811,786 entitled Dual Period Gyro-Compass issued November 5, 1957 to L. F. Carter. Also the dimensions of the ligaments and their supports relative to the vertical ring have been exaggerated for the sake of clarity.

It may be stated, however, that the vertical ring carries a rotor case mounted with freedom of angular movement about a horizontal axis XY which is perpendicular to the vertical axis RS of the vertical ring, and the rotor contained in the rotor case, being an electrically driven rotor, requires the supply of electric current to be taken to its three-phase motor. For this purpose three leads 3, 4, 5 are provided which are contained in a common sheath clamped to the vertical ring by a clamp 6 and to a U-shaped extension 7 of the vertical ring by a clamp 8. The ends of the leads 3, 4, 5 on the U-shaped extension 7 are connected to the ends 9, 10, 11 of three flexible conductors 12, 13, 14 extending between the two arms 15, 16 of the U-shaped extension 7. The ends 9, 10, 11 of the flexible conductors are mounted in the arm 15 by means of insulating plugs 17, 18, 19 cemented in holes in the arm. The other ends of the flexible conductors 12, 13, 14 are also mounted in insulating plugs in the other arm 16 of the extension 7, but in this case no connections are made on the outside surface of the arm.

Connected to the centre-points of the three flexible conductors 12, 13, 14, which centre-points coincide with the vertical axis of the vertical ring, are three primary conductors 20, 21, 22 extending in a direction perpendicular to the lengths of the flexible conductors. The primary conductors are connected to the flexible conductors in any suitable manner, such as by soldering or welding, and the primary conductors and flexible conductors may be made of platinum wire insulated by insulating varnish. The primary conductors 20, 21, 22 are attached at the ends remote from the points of attachment 23, 24, 25 to a non-flexible sheet of insulating material 27, such as Bakelite screwed on to a bracket 26, formed as part of the follow-up member 1. These ends of the primary conductors are attached to the sheet 27 by means of three turret lugs 28, 29, 30 riveted to the sheet, the ends of the wires being soldered within the lugs. The ends of the wires may then be connected to a suitable source of electrical energy such as a three-phase generator.

It will be appreciated that due to the flexibility of the flexible conductors 12, 13, 14, the torque produced on the sensitive element on relative rotation of the follow-up member 1 and the sensitive element 2 will be reduced by an order of magnitude as compared with the torque that would be applied if the primary conductors were rigidly connected between the follow-up member 1 and points on the sensitive element 2 in the vicinity of the pivot axis, as has previously been proposed.

A similar arrangement is preferably provided about the pivot axis of the rotor case in the vertical ring to conduct current from the leads 3, 4, 5 to leads on the rotor case.

It will be appreciated that the arrangement of ligaments could be reversed, that is, the secondary ligaments could be connected between the arms of a U-shaped member forming part of the follow-up frame with their centre points connected to primary ligaments extending from points of attachment on the vertical ring.

It will also be appreciated that each of the ligaments 12, 13, 14 could be replaced by a very flexible diaphragm, the primary ligaments 20, 21, 22 being attached to their centres. The diaphragms could be mounted in bores in a sheet of insulating material attached to the member 7 and could be conducting or non-conducting and coated with conducting material suitably connected to the leads 3, 4, 5 at the peripheries of the diaphragms. However, the use of diaphragms is more advantageous when it is desired to conduct current from the follow-up member directly to the sensitive element and such a use is illustrated in Fig. 2.

Another embodiment of the invention is illustrated in Figs. 2, 3, 4 and 5 of the drawings. Referring to these figures there is shown gyroscopic apparatus comprising a sensitive element 31 consisting of a platform carrying two rotors, not shown, mounted for spinning in rotor cases 32, 33 integral with the platform. The sensitive element 31 is mounted, in well known manner, with limited freedom of angular movement about two mutually perpendicular axes XY, RS, perpendicular to the spin axes of the rotor relative to a supporting follow-up member 34, by means of a gimbal ring 35. Stops (not shown) limit the freedom of movement to a small degree. The follow-up member 34 is also mounted with freedom of angular movement about two mutually perpendicular axes normally in line with the axes XY, RS in a main support (not shown) and is servo-controlled about these axes, by means of servomotors (not shown) energised from pick-off devices (not shown), to follow the angular movements of the sensitive element 31 about its pivot axes. Gyroscopic apparatus having a servo-controlled follow-up member is generally well-known in the art and need not be described in detail since the nature of the invention can be clearly understood without such description.

Each of the rotors is driven by an electric motor and in Fig. 2 two leads 36, 37 are shown as coming from within the rotor case 32. Two primary ligaments 38, 39 are connected at their external ends to the follow-up member 34 and provision is made, according to the invention, for connecting these primary ligaments to the leads 36, 37, in such a manner that, when the ligaments 38, 39 are connected to a suitable source of electrical energy, current may be conducted to the motor to drive the rotor and inappreciable torque is applied by the ligaments to the sensitive element.

As shown, the ligament 38 is connected to the centre of a flexible diaphragm 40 which is located on the sensitive element, near the point of intersection of the axes and electrically connected to the lead 36. Similarly, the ligament 39 is connected to the centre of a flexible diaphragm 41 which is located on the sensitive element parallel to the first diaphragm but on the opposite side of the point of intersection of the axes and electrically connected to the lead 37. Two leads 42, 43, from the rotor case 33 are also electrically connected to the diaphragms 40, 41 (Fig. 3) but these are not shown in Fig. 2 and need not be referred to hereinafter for the sake of clarity. The mounting of the ligaments 38, 39 on the diaphragms and the follow-up member is such that the lengths of the ligaments are just taut with no tension and the ligaments extend in directions passing through the point of intersection of the axes XY, RS. Details of the mounting are shown in Figs. 2 and 3.

Each diaphragm is made of thin flexible non-conducting material, such as terylene or rubber, coated on one surface with a thin coating of conductive material. The ligament 38 which may be of platinum passes through the diaphragm 40 and its conducting coating and is electrically connected to the coating by a metal ferrule 44 which serves to locate the wire. In order to improve the electrical connection the end of the ligament may be soldered. The ferrule is peened over a pressure washer 45.

The diaphragm 40 is fixed to a hollow Bakelite plug 46 by means of a conducting ring-shaped member 51 screwed to the plug. The ring-shaped member 51 has arms 47, 48 to which leads 36 and 42 may be soldered. The plug 46 is secured to the sensitive element 31 by means of screws, two of which 49, 50 are shown, in such a manner that the plug extends into a bore 52 in the platform extending with its line of symmetry passing through the point of intersection of the axes XY, RS. The bore is shown in cross section in Fig. 5, the channels 53, 54 being provided so that the assembly of plug, ligament, diaphragm and conducting member 51 with the leads 36, 42 presoldered onto the arms 47, 48 may be inserted as a unit into the bore.

An identical arrangement of plug, diaphragm and ring-shaped conducting element is provided for the primary ligament 39 and the leads 37, 43.

It will be appreciated that each diaphragm constitutes supporting means for a primary ligament and locates the primary ligament attached to it in such a manner that radial movement of the point of attachment of the ligament is prevented but angular movement of the ligament and the diaphragm about any diameter passing through the point of attachment is readily permitted. As a result, when relative angular movement between the follow-up member 34 and the sensitive element 31 takes place about the axes XY, RS, the torque produced on the sensitive element by the ligament-diaphragm electrical connection is reduced by an order of magnitude compared with the torque that would be applied if the ligament were rigidly connected at its end to the sensitive element in the vicinity of the point of intersection, as has previously been proposed.

In a modified form of the embodiment of Figs. 2–4, each diaphragm may be of conducting material stamped out to a shape having an outline as in Fig. 4, the diaphragm being directly screwed onto the Bakelite plug and directly connected to the leads 36, 42.

I claim:

1. Electrical gyroscopic apparatus having a lead in electrical circuit comprising a follow-up member, a sensitive element pivotally mounted thereon about two mutually perpendicular axes, a flexible diaphragm or membrane forming a part of said circuit secured around its periphery to said element in the vicinity of the intersection of said axes, and a ligament forming a second part of said circuit attached to the center of said diaphragm and extending in a direction perpendicular to and adjacent the point of intersection of said axes to a point of attachment to said member.

2. Gyroscopic apparatus as claimed in claim 1 wherein the diaphragm is made of conducting material and is insulated from contact with the body of the sensitive element.

3. Gyroscopic apparatus as claimed in claim 1 wherein the diaphragm is made of insulating material and is coated with conductive material insulated from the body of the sensitive element but electrically connected to said primary conducting ligament.

4. Electrical gyroscopic apparatus having a lead in electrical circuit comprising a follow-up member, a sensitive element pivotally mounted thereon about two mutually perpendicular axes and having a central bore extending in a direction perpendicular to said axes around the intersection of said axes, a flexible diaphragm or membrane forming a part of said circuit secured around its periphery to said bore in the vicinity of the intersection of said axes, and a ligament forming a second part of said circuit attached to the center of said diaphragm and extending in a direction perpendicular to and adjacent the point of intersection of said axes to a point of attachment to said member.

5. Gyroscopic apparatus as claimed in claim 4 wherein the diaphragm is made of conducting material and is insulated from contact with the body of the sensitive element.

6. Gyroscopic apparatus as claimed in claim 4 wherein the diaphragm is made of insulating material and is coated with conductive material insulated from the body of the sensitive element but electrically connected to said primary conducting ligament.

7. Gyroscopic apparatus as claimed in claim 4 wherein the bore extends through the sensitive element and wherein a second primary ligament extends from a point of attachment on the follow-up member diametrically opposed to the point of attachment of the first primary ligament on the follow-up member through the opposite end of the bore to a point of attachment at the centre of a second diaphragm similarly constructed and arranged as the first diaphragm.

References Cited in the file of this patent
UNITED STATES PATENTS

| | | |
|---|---|---|
| 1,226,882 | Henderson | May 22, 1917 |
| 1,359,333 | Cowles | Nov. 16, 1920 |
| 1,743,533 | Davis | Jan. 14, 1930 |
| 2,740,299 | Jewell | Apr. 3, 1956 |